Patented Nov. 18, 1930

1,781,711

UNITED STATES PATENT OFFICE

RICHARD E. SUMNER, OF PLAINFIELD, NEW JERSEY, ASSIGNOR, BY MESNE ASSIGNMENTS, TO THE CALCO CHEMICAL COMPANY, INC., A CORPORATION OF DELAWARE

SHELLAC COMPOSITION

No Drawing. Application filed April 5, 1928, Serial No. 267,802. Renewed December 31, 1929.

This invention relates to shellac compositions and more especially to compositions for use in making phonograph record discs.

The invention aims to provide a shellac composition for making phonograph records which is of better quality than, and may be made at less cost than, the shellac compositions heretofore used for that purpose. For making disc records, it has long been customary to utilize a composition consisting of fillers of various kinds, such as terra alba and barytes, bound together with an agglomerant consisting either of pure shellac, or of shellac adulterated with less expensive substitutes such as copal and damar resins. Such compositions have heretofore contained an insoluble pigment, usually carbon black.

I have discovered that a more durable and evenly colored record composition may be produced at less expense, by omitting the usual carbon black and incorporating nigrosine base dye in the composition. By this means, an even and effective coloring of the whole composition is secured, while at the same time the shellac content of the composition may be reduced with a resulting saving in cost.

A specific example of a composition embodying the invention and adapted to produce a black record consists of the following ingredients in the proportions specified:

| | Parts |
|---|---|
| Shellac | 23.75 |
| Nigrosine base | 2.00 |
| Cotton flock | 4.00 |
| Mineral filler | 70.25 |

This composition produces a record superior in strength, in durability and in color to one produced from a similar composition having carbon black as the coloring medium and containing 5% more shellac than my composition.

Instead of nigrosine base, I may use other azine bases, such as induline base and the other specific ingredients above mentioned are subject to modification as in the well known shellac compositions heretofore used. Thus, for example, wool may be substituted for the cotton flock, and the filler may consist of any of the ingredients or mixtures of ingredients heretofore used in record compositions, and the agglomerant may be either pure shellac or adulterated shellac, (i. e. shellac substitutes with a substantial portion of pure shellac) both of which are to be understood to be included by the term "shellac" as used herein.

What I claim is:

1. A composition of matter for use in making phonograph records and for other purposes, comprising a filler, a shellac agglomerant by which the filler is bound together, and an azine base dye.

2. A composition of matter for use in making phonograph records and for other purposes, comprising a filler, a shellac agglomerant by which the filler is bound together, and nigrosine base dye.

3. A composition of matter for phonograph records having substantially the following composition:—shellac 23%; nigrosine base dye 2%; cotton-flock 4%, and filler 70.25%.

4. A composition of matter for use in making phonograph records consisting of shellac and a filler, and containing approximately 2% of nigrosine base dye.

In testimony whereof I have hereunto set my hand.

RICHARD E. SUMNER.